Sept. 20, 1938.  C. J. DU PONT ET AL  2,130,418
TRUCK
Filed Aug. 19, 1937
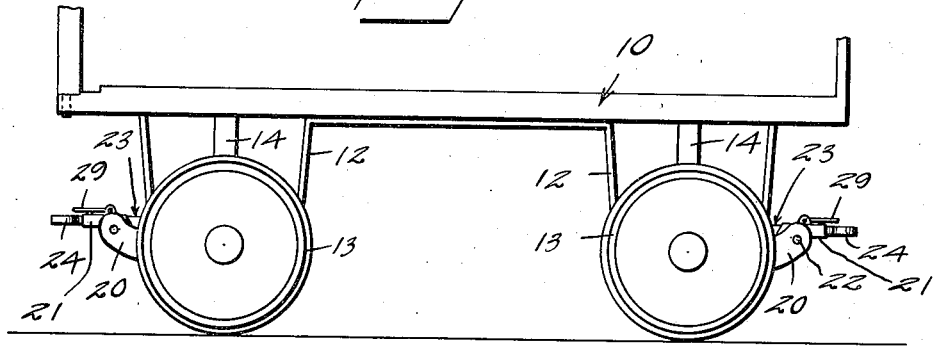
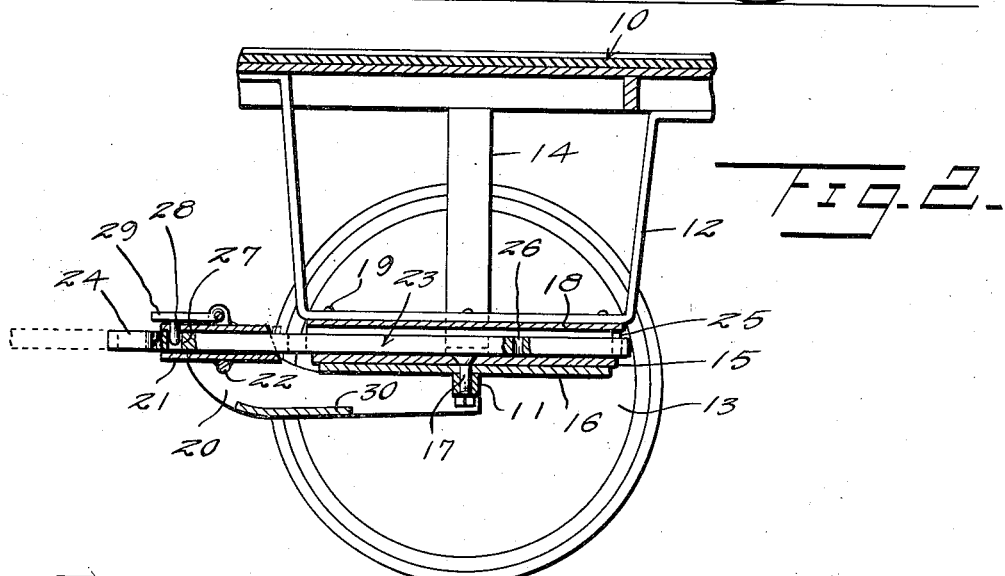
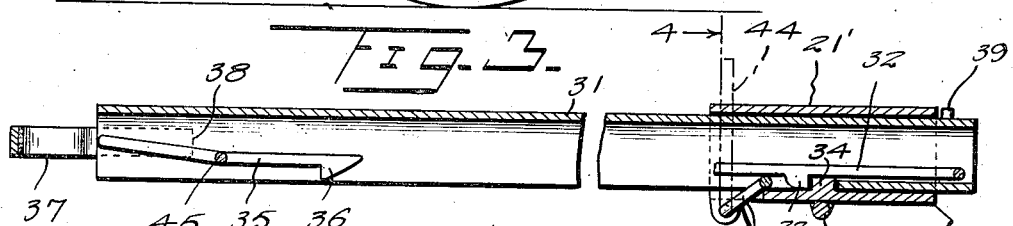
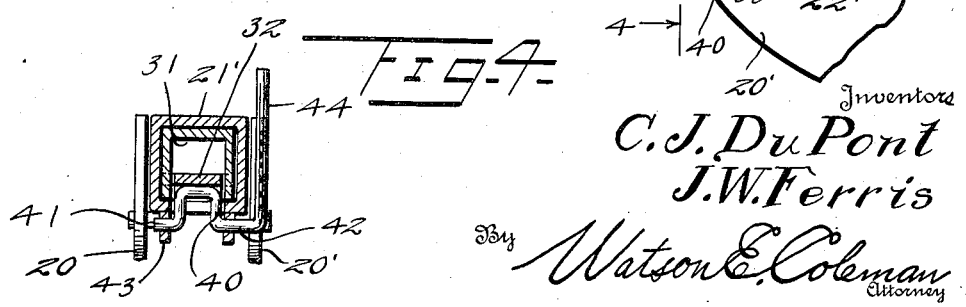
Inventors
C. J. Du Pont
J. W. Ferris
By Watson E. Coleman
Attorney Patented Sept. 20, 1938

2,130,418

UNITED STATES PATENT OFFICE 2,130,418

TRUCK

Carl J. Du Pont and John W. Ferris, Huntington, Ind.

Application August 19, 1937, Serial No. 159,969

9 Claims. (Cl. 280—116)

This invention relates to trucks and more particularly to an improved truck for use in movement of merchandise or the like on platforms, in warehouses or the like.

An object of this invention is to provide an improved manually operable truck which is so constructed that it can be drawn or pulled from either end, the truck being provided with a pair of fifth wheels.

Another object of this invention is to provide in a fifth wheel or pivotal means for truck axles, means whereby the fifth wheel may be easily locked against rotation, the truck proper being provided with a pair of fifth wheels which may be releasably locked against turning so that when desired the truck may be moved or pulled from either end.

A further object of this invention is to provide in a baggage or article carrying truck a combined draw bar and fifth wheel locking means so that when desired the draw bar may be moved to a fifth wheel locking position in which position the draw bar is in an out-of-way position in addition to locking the fifth wheel of the truck against turning movement.

A still further object of this invention is to provide in a truck of this character a combined draw bar and a fifth wheel locking means which is so constructed that the draw bar itself may serve as a coupling means to couple a number of trucks together with certain of the trucks having their fifth wheels locked against turning.

With the foregoing and other objects in view, the invention will be more fully described hereinafter, and will be more particularly pointed out in the claims appended thereto.

In the drawing, wherein like symbols refer to like or corresponding parts throughout the several views, Figure 1 is a detailed side elevation of a truck having a pair of fifth wheels, means mounted thereon constructed to an embodiment of this invention.

Figure 2 is an enlarged vertical section through substantially one of the trucks.

Figure 3 is a longitudinal section partly broken away of a modified form of this invention.

Figure 4 is a sectional view taken on the line 4—4 of Figure 3.

Referring to the drawing, the numeral 10 designates generally a truck body having a pair of transversely extending axles 11 adjacent each end on which wheels 13 are rotatably mounted. Each axle 11 is supported below the body 10 of the truck by means of brackets 12 and 14. The brackets 12 are constructed in substantially U-shape with the free legs thereof extending uppermost and secured by any suitable means through the bottom of the truck body. The bracket or brace 14 extends transversely of the vehicle and preferably the brackets 14 are secured to a plate 15 forming part of the fifth wheel structure.

A fifth wheel or circular plate 16 is disposed below the stationary plate 15 and a pivotal member 17 extends through the axle 11, the plate 16 and the upper or stationary plate 15. A substantially U-shaped housing 18 is secured to the top of the stationary plate 15 and preferably the bight of the U-shaped bracing member or bracket 12 is secured as by bolts 19 or welded to the top of the channel member 18. This channel member 18 is substantially equal in length to the diameter of the plate 15 and is provided with open opposite end portions. A pair of draw bar supporting arms 20 are secured as by welding or the like to the movable plate member 16 and extend forwardly and upwardly as shown in Figures 1 and 2.

A tubular member 21 is disposed between the arms 20 and is rockably mounted on a transversely extending pin or shaft 22 which is fixed to the under side of the tubular member or guide 21. A draw bar and fifth wheel locking member generally designated as 23 is slidable in the guide member 21 and is provided at its outer end with a handle 24. The inner end of the draw bar 23 has a stop member 25 secured thereto which is adapted to engage against the inner end of the guide member 21 as shown in dotted lines in Figure 2 so as to limit the outward movement of the draw bar 23.

The draw bar 23 is provided adjacent the inner end thereof with a hole or recess 26 and adjacent the outer end thereof with a second hole or recess 27 in a selected hole of which a locking pin 28 carried by a rock lever 29 is adapted to engage. The draw bar 23 when in a locking position is adapted to engage within the tubular member 18 as shown in full lines in Figure 2 and in this position the locking pin 28 will engage in the outer recess or opening 27. In this locking position the guide member 21 is also held against vertical rocking movement.

When the draw bar or handle 23 is pulled outwardly to an operative position the lever 29 is raised so as to pull the locking pin 28 out of the recess 27 and then the draw bar may be easily pulled outwardly through the guide member 21 until the stop member 25 engages against the inner end of the guide 21. In this latter position the locking pin 28 will drop into the hole or recess 26 so that while guide member 21 may then be vertically rocked relative to the supporting arms 20, the draw bar 23 will be locked against movement relative to the guide 21. The arms 20 are preferably held in spaced-apart relation by a web or plate 30 which may be welded or otherwise secured between the two arms 20.

In the modification shown in Figures 3 and 4, a pair of supporting arms 20' are adapted to be secured to the plate 16 as shown in Figure 2, and a guide member 21' is fixed to a shaft 22' which is rockably mounted between the arms 20'. In this form a channeled or substantially U-shaped draw bar 31 is provided which is adapted to slidably engage in the guide member 21'. The draw bar 31 is provided adjacent the inner end thereof with a rock lever 32 having a pawl or lug 33 which is adapted to engage against a lug or stop member 34 fixedly carried by the guide member 21' on the inside thereof. The lug 33 is carried by the lever 32 at a point intermediate the ends of this lever for a purpose hereinafter to be described.

The draw bar 31 is also provided adjacent the outer end thereof with a second rock lever 35 having pawl or lug 36 adjacent the inner end thereof. This lug 36 is adapted to engage over the lug 34 when the draw bar 31 is moved inwardly so as to hold the draw bar 31 against outward movement. It will be understood that when the draw bar 31 is in an innermost position, the draw bar 31 will be engaged in a channel similar to the channel 18 so as to lock the fifth wheel structure disclosed in Figures 1 and 2 against rotation. A looped handle 37 is secured to the draw bar 31 and the inner end 38 of this handle 37 may contact with the outer end of the guide sleeve 21' so as to limit the inward movement of the draw bar 31 relative to the sleeve 21'. A stop member 39 may be secured to the draw bar 31 adjacent the inner end thereof to prevent withdrawal of the draw bar 31 from the guide sleeve 21'.

A substantially U-shaped lever releasing member 40 is carried by the sleeve 21' adjacent the outer end thereof, the releasing member 40 having outturned end portions 41 and 42 which are rockably mounted in dependent lugs 43 carried by the guide member 21'. An L-shaped releasing lever 44 is integral with the extension 42 and extends vertically alongside the guide sleeve 21' as shown in Figures 3 and 4. The releasing member 40 as shown in Figure 3 is adapted when the draw bar 31 is in an outermost position to engage against the under side of the lever 32 forwardly of the pawl 33 and when the lever 44 is rocked forwardly so as to raise the U-shaped releasing member 40, the pawl 33 will be moved upwardly into a released position thus permitting the inward sliding movement of the draw bar 31 to a fifth wheel locking position.

When the draw bar 31 is in an innermost position, the pawl 36 will ride over the lug 34 and engage against the rear side thereof. In this position when the releasing lever 44 is rocked forwardly and downwardly, the releasing member 40 will engage the lever 35 inwardly of the pivot 45 thereof.

As shown in Figure 1, the truck 10 is provided with a pair of fifth wheel structures each having a draw bar structure similar to the structure shown in Figure 2. However, the truck may also be provided with the structure shown in Figures 3 and 4. With a truck provided with a fifth wheel structure and draw bar structure as shown herein, the truck may be pulled from either end and either or both ends of the truck may have pivoted fifth wheel structures or if desired, one end of the truck may have the fifth wheel structure thereof locked but shows the draw bar thereof in an inner and locked position similar to that shown in Figure 2.

It is, of course, understood that various changes and modifications may be made in the details of construction and design of the above specifically described embodiment of this invention without departing from the spirit thereof, such changes and modifications being restricted only by the scope of the following claims.

We claim:

1. A truck comprising a body, a pair of axles disposed below said body, wheels on said axles, a fifth wheel structure swingably connecting one of said axles to said body, a draw bar, a guide engaging said draw bar, means supporting said guide from said fifth wheel structure, said draw bar being movable inwardly of said fifth wheel structure through said guide, and means carried by said fifth wheel structure engageable with said draw bar to lock said fifth wheel structure against turning.

2. A truck comprising a body, a pair of axles disposed below said body, wheels on said axles, a fifth wheel structure swingably connecting one of said axles to said body, a guide member, means supporting said guide member from a portion of said fifth wheel structure, a draw bar slidably engaging said guide member, means carried by said fifth wheel structure engageable with said draw bar to lock said fifth wheel structure against turning, and means carried by said guide member engageable with said draw bar to hold said draw bar in extended operative position or retracted fifth wheel locking position.

3. A truck comprising a body, a pair of axles disposed below said body, wheels on said axles, a fifth wheel structure swingably connecting one of said axles to said body, a tubular guide member, means engageable with said fifth wheel structure supporting said guide member forwardly of said fifth wheel structure, a channeled member carried by said fifth wheel structure adapted to slidably receive therein said draw bar whereby to lock said fifth wheel structure against turning, and releasable means engageable with said draw bar to releasably hold said draw bar in extended position relative to said guide member or in retracted fifth wheel locking position.

4. A truck comprising a body, a pair of axles disposed below said body, wheels on said axles, a plate secured to said body above one of said axles, a second plate secured to said one axle and engageable with said first plate, means pivotally securing said two plates together, a guide member, means supporting said guide member forwardly of said one axle for swinging movement therewith, a draw bar slidably engaging said guide member, and means carried by said first plate engageable with said draw bar when said draw bar is in retracted position to releasably lock said second plate against turning movement.

5. A truck comprising a body, a pair of axles disposed below said body, wheels on said axles, a fifth wheel structure swingably connecting one of said axles to said body, said fifth wheel structure including a stationary plate fixed relative to said body and a rotatable plate rotatably engaging said first plate and fixed relative to one of said axles, a guide member, bracket means carried by said second plate engaging said guide member to support said guide member forwardly of said two plates, a draw bar slidably engaging said guide member, means carried by said guide member engageable with said draw bar to lock said draw bar in an outer extended position or in an inner retracted position, and means carried by said first plate engageable with said draw bar to lock said second plate against rotation relative to said first plate.

6. A truck comprising a body, a pair of axles disposed below said body wheels on said axles, a stationary plate fixed relative to said body above one of said axles, a rotatable plate engaging said first plate and fixed relative to one of said axles, means rotatably securing said plates together, a guide member, a bracket structure fixed to said one axle and extending forwardly thereof, means swingably securing said guide member to said bracket structure, a draw bar slidably engaging said guide member, a channeled member carried by said first plate in alignment with said guide member and adapted to slidably receive said draw bar when said draw bar is in a retracted position to thereby hold said second plate against rotation, and means locking said draw bar in an extended position relative to said guide member or a retracted position relative thereto.

7. A fifth wheel structure comprising a stationary plate, a rotatable plate engaging said stationary plate, bracket means secured to said rotatable plate and extending forwardly therefrom, a guide member, means swingably securing said guide member to said bracket means, a draw bar slidably engaging said guide member, and means carried by said stationary plate engageable with said draw bar when said draw bar is in retracted position to thereby hold said rotatable plate against turning movement.

8. A fifth wheel structure comprising a stationary plate, a rotatable plate, means rotatably securing said rotatable plate to said stationary plate, a pair of forwardly extending arms secured to said rotatable plate, a guide member disposed between said arms, means swingably securing said guide member to said arms, a draw bar slidably engaging said guide member, a channeled member carried by said stationary plate in substantial alignment with said guide member when said guide member is in horizontal position, said draw bar when in retracted position engaging in said channel member to hold said rotatable plate against rotation, said draw bar having a pair of spaced-apart recesses therein, and a locking member carried by said guide member engageable in a selected recess to releasably lock said draw bar in either an extended position or a retracted position within said channel member.

9. A fifth wheel structure comprising a stationary plate, a rotatable plate engaging said stationary plate, means rotatably securing said rotatable plate to said stationary plate, a pair of forwardly extending arms secured to said rotatable plate, a guide member disposed between said arms, means swingably securing said guide member between said arms, a draw bar substantially U-shaped in transverse section slidably engaging said guide member, a channeled locking member carried by said stationary plate in horizontal alignment with said guide member and adapted to receive therein said draw bar to thereby hold said rotatable plate against rotation, a pair of pawls rockably carried within said draw bar, a pawl engaging member carried by said guide member to selectively hold said draw bar in an extended operative position or a retracted locking position, and a pawl releasing member carried by said guide member.

CARL J. DU PONT.
JOHN W. FERRIS.